(12) United States Patent
Geserich

(10) Patent No.: US 10,502,613 B2
(45) Date of Patent: Dec. 10, 2019

(54) DYNAMIC SCALE FOR FLAT GOODS TRANSPORTED THEIR SIDES, AND CONTROL METHOD THEREFOR

(71) Applicant: Francotyp-Postalia GmbH, Berlin (DE)

(72) Inventor: Frank Geserich, Friedrichsthal (DE)

(73) Assignee: Francotyp-Postalia GmbH, Berlin (DE)

( * ) Notice: Subject to any disclaimer, the term of this patent is extended or adjusted under 35 U.S.C. 154(b) by 214 days.

(21) Appl. No.: 15/795,378

(22) Filed: Oct. 27, 2017

(65) Prior Publication Data

US 2018/0120145 A1 May 3, 2018

(30) Foreign Application Priority Data

Nov. 1, 2016 (DE) .................... 20 2016 106 125 U

(51) Int. Cl.
*G01C 19/00* (2013.01)
*G01G 11/04* (2006.01)
*G01B 11/04* (2006.01)
*G01B 11/06* (2006.01)
*G01G 23/00* (2006.01)
(Continued)

(52) U.S. Cl.
CPC .............. *G01G 19/002* (2013.01); *B65H 7/14* (2013.01); *G01B 11/043* (2013.01); *G01B 11/046* (2013.01); *G01B 11/0691* (2013.01); *G01D 5/347* (2013.01); *G01G 11/003* (2013.01); *G01G 11/04* (2013.01); *G01G 11/12* (2013.01); *G01G 19/005* (2013.01); *G01G 23/00* (2013.01);
(Continued)

(58) Field of Classification Search
CPC .... G01G 19/002; G01G 11/003; G01G 11/04; G01G 11/12; G01G 19/005; G01G 23/00; B65H 7/14; B65H 2511/11; B65H 2701/1311; B65H 2701/1313; B65H 2701/1916; G01B 11/043; G01B 11/046; G01B 11/0691; G01D 5/347
See application file for complete search history.

(56) References Cited

U.S. PATENT DOCUMENTS 5,990,422 A * 11/1999 Komori ................ G01G 19/035
177/119
6,265,675 B1 7/2001 Hubler et al.
(Continued)

FOREIGN PATENT DOCUMENTS

EP 2282185 A1 2/2011

*Primary Examiner* — Natalie Huls
*Assistant Examiner* — Monica S Young
(74) *Attorney, Agent, or Firm* — Schiff Hardin LLP

(57) ABSTRACT

In a dynamic scale and control method for flat goods transported on their sides, use an input-side first assembly for thickness measurement, a transport device having transport belts arranged on a weighing plate. A control processor starts a length measurement and the driving of the transport belts, and starts a thickness measurement and implement a dynamic weighing process during the transport of a first flat good. A next flat good is supplied to the input of the dynamic scale if a valid weight measurement result is present for the predecessor good, and ejection of the predecessor good or end of the weight measurement occur if a third sensor at the input of a takeoff device of the dynamic scale detects the leading edge of the predecessor good, and a check yields that no valid weight measurement result is present for the predecessor good.

18 Claims, 6 Drawing Sheets

(51) Int. Cl.
  *B65H 7/14* (2006.01)
  *G01D 5/347* (2006.01)
  *G01G 11/00* (2006.01)
  *G01G 11/12* (2006.01)
  *G01G 19/00* (2006.01)

(52) U.S. Cl.
  CPC ... *B65H 2511/11* (2013.01); *B65H 2701/1311* (2013.01); *B65H 2701/1313* (2013.01); *B65H 2701/1916* (2013.01)

(56) References Cited

U.S. PATENT DOCUMENTS

| | | | |
|---|---|---|---|
| 6,947,912 B1* | 9/2005 | Huebler | G01G 19/4148 177/119 |
| 8,698,012 B2 | 4/2014 | Huebler et al. | |
| 8,969,743 B2 | 3/2015 | Huebler et al. | |
| 2001/0015291 A1* | 8/2001 | Huebler | G01G 19/005 177/119 |
| 2002/0040260 A1* | 4/2002 | Huebler | G01G 19/005 700/303 |
| 2002/0060097 A1* | 5/2002 | Thiel | G01G 19/4148 177/25.15 |
| 2006/0122950 A1* | 6/2006 | Hubler | G01G 19/005 705/407 |
| 2008/0035390 A1* | 2/2008 | Wurz | G01B 11/04 177/25.15 |
| 2010/0126780 A1* | 5/2010 | Inoue | G01G 13/08 177/1 |
| 2014/0163723 A1* | 6/2014 | Geserich | B65H 7/18 700/230 |
| 2014/0172156 A1* | 6/2014 | Mueller | B65H 7/18 700/230 |

\* cited by examiner

DYNAMIC SCALE FOR FLAT GOODS TRANSPORTED THEIR SIDES, AND CONTROL METHOD THEREFOR

BACKGROUND OF THE INVENTION

Field of the Invention

The present invention concerns a dynamic scale for flat goods transported on their sides, and a control method for such a dynamic scale. The flat goods transported can be mail goods such as enveloped letters or postcards. Such a dynamic scale is used in a goods processing system, for example as a modular station of a mail route of a franking system.

Description of the Prior Art

The mail route of a franking system is typically formed by a number of mail piece processing stations arranged individually in series. A placement station is set up upstream of an individualization station, i.e. often at the start of the mail route, and serves for the placement of individual or stacked mail pieces at the individualization station, which individualizes the items in the stack. The individualized mail pieces are supplied via a dynamic scale to a franking machine, and then are stored in a tray station. In the processing of flat goods with different formats, the stack should contain optimally uniform flat goods, but wherein format deviations of up to 20% are still permissible. An example of a stack that can be a letter stack, postcard stack or another mail piece stack, which can be individualized, is discussed herein, but different types of stacked, flat goods are not precluded.

In the United States, the standard "Letter" formats are to be processed, such as Letter 8½ inch×11 inch (21.59 cm×27.94 cm), Letter 8½ inch×14 inch (21.59 cm×35.56 cm), Letter 14⅞ inch×11.69 inch (37.8 cm×29.69 cm).

Especially in Germany, the formats B4 (25.0 cm×35.3 cm), B5 (17.6 cm×25.0 cm), B6 (12.5 cm×17.6 cm) and C4 (22.9 cm×32.4 cm), C5 (16.2 cm×22.9 cm), C6 (11.4 cm×16.2 cm) are typical. The sizes of the German paper formats were already established in the year 1922 by the German Institute for Standards (DIN), in the DIN Standard DIN 476.

A dynamic scale of the commercially available aJetmail® franking system is described in EP 974 819 B1. The letter to be weighed should be located entirely and alone on the weighing unit in order to achieve a sufficiently precise and error-free weight measurement. The length of the weighing unit is thereby determined by the transport velocity, the longest letter to be weighed and an additional measurement route. However, the B4 letter formats that correspond to the longest letters to be weighed require a large gap. The gap between the standard letters is then so large that a high letter throughput cannot be achieved. Thus, however, only 50 lpm (letters per minute) is achieved. The throughput is therefore oriented toward a standard letter because the gap is smaller. Standard letters are those letters of Deutsche Post AG having a format of (90 mm to 125 mm×140 mm to 235 mm) and making up the largest fraction of the mail volume. As used herein, the term "standard letter" means the C6 long (235 mm in length) and US10 (241 mm in length) formats. The throughput can theoretically be further increased by increasing the transport velocity of the letters with a correspondingly operated transport unit of the dynamic scale, but the transport velocity would then have to also be adapted to the remaining mail piece processing stations of the total franking system. It would be disadvantageous if the multiple stations or modules of the entire franking system wound need to be redesigned in this regard.

A dynamic scale (DE 10 2011 100 176 B4) of the commercially available Centormail® franking system has two weighing units arranged cascading, through which a letter standing on edge passes with a transport velocity of 680 mm/s. Given standard letters, up to 90 lpm is therefore achieved. Moreover, all additional letter formats may be dynamically processed. However, the material and financial cost is relatively large.

U.S. Pat. No. 5,990,422 discloses a dynamic scale composed of a number of individual conveyor scales that are arranged in series, one after another, and at which sensors are arranged in order to additionally implement at least one dimension measurement in addition to the weight measurement. The length of the respective article is measured by sensors that are arranged between the conveyor scales. The number of sensors and conveyor scales, as well as a laborious control method depending on the length of the unit load, is disadvantageous with regard to costs. Also, it is not unusual for flat goods at the input of the dynamic scale to be supplied at an increased distance from the alignment wall. It cannot then be ensured by the dynamic scale that the flat goods are less distant from the alignment wall at the output of said dynamic scale.

U.S. Pat. No. 8,466,380 B2 discloses a dynamic scale for measuring articles that are transported lying on their side. The device has a conveyor part, a number of measurement parts and a determination part. The conveyor part contains a number of conveyor devices that are arranged one after another in series for articles that are supplied in succession to the conveyor scales of the dynamic scale, said conveyor scales being arranged in a line. The multiple measurement parts measure the weight or the dimensions of the respective articles that are transported in succession by the transport parts of the dynamic scale. The determination part determines the weight or the dimensions of the respective article on the basis of the measurement values from the multiple measurement parts. The dimensions of the respective article are measured by the plurality of sensors that are arranged in a portal frame between the conveyor scales, or at predetermined intervals in three directions that are orthogonal to one another. The multiple sensors of a length measurement sensor are arranged in the lateral parts of a portal frame that, in the conveyance direction, are situated between the final section of the first conveyor weighing unit and the first section of the second conveyor weighing unit. A width sensor is designed in the horizontal lateral parts of the portal frame that are situated transversely to the conveyance direction. The width sensor has light sensor elements that are arranged opposite light emission elements in order to detect the width of each of the transported article in a direction that is orthogonal to the conveyance direction. Multiple light-emitting elements of a thickness sensor are arranged at a first vertical lateral element of the portal frame, with light sensor elements being arranged on a different vertical lateral element of the portal frame, opposite the aforementioned first vertical lateral element. The light-emitting elements and the light sensor elements are arranged vertically starting from a lowermost element near to the surface of the conveyor devices of the first and second conveyor weighing units. Because so many conveyor weighing units are necessary, it has a large and costly overall design, and does not fit into a small space.

From DE 102010009431 A1, a fast dynamic scale and a method to control the fast dynamic scale are known that, in addition to a weighing unit having a shortened length that is effective for weighing, has a switchable takeoff device for unit loads that are standing on edge, such as letters in envelopes. Five sensors are polled by a control processor in order to determine the position of the unit load, and three motors are activated. The weighing unit is comprised of a weighing cell and a transport mechanism having a first motor to drive it, wherein the transport mechanism is arranged with the motor on the weighing cell. The weighing cell is loaded with a preload, and has a first sensor that is arranged across the axis of a first deflection roller of the transport mechanism at the beginning of the weighing unit, and that emits a first signal to the control processor, which then starts the weighing process for a unit load. A second sensor is arranged in a position near the middle of the weighing unit, in the transport direction, and emits a second signal to the control processor, which then generates a communication that a unit load following the unit load may be supplied. The position of the second sensor is located at a distance d1 from the axis of the first deflection roller, which distance d1 corresponds to the length of a shortest letter plus a safety margin. The distance between successive unit loads may accordingly be shortened by shortening the length of the weighing unit. An actuator or a second motor serves to open and close the switchable takeoff device. A third motor produces the letter transport within the switchable takeoff device. If applicable, a fourth motor is provided for connection and disconnection of the switchable takeoff device. The axis of a second deflection roller of the transport mechanism is situated at a distance d2 from the second sensor in the transport direction. A third sensor is positioned at a distance d3 from the axis of the second deflection roller, in front of the switchable takeoff device. A fourth sensor and the actuator and/or the motors are arranged in the switchable takeoff device. That allows both the shortest and the longest unit loads to be taken off the weighing unit and transported further. The takeoff device is to be additionally operated in order to pinch the unit load if the leading edge of said unit load reaches the fourth sensor at the input of the takeoff device, wherein the weighing process has then already ended. The pinched unit load is transported out of the takeoff device in the transport direction. Moreover, a fifth sensor at a fifth distance after the fourth sensor may be provided downstream of the weighing unit, in the takeoff device. The method then also includes a) additional operation of the takeoff device if the weighing process has not ended, b) stopping the transport of the unit load in the scale, c) transport of the unit load back to the weighing unit, d) static weighing of the unit load, e) further control of the weighing unit and of the takeoff device to eject the unit load. A relatively complicated design of the switchable takeoff device, and the complicated activation of the dynamic scale if a transport of the unit load in the scale is stopped, would be disadvantageous. Unwanted vibrations thereby occur, and occur upon transport of the unit load back to the weighing unit, before the following static weighing of the unit load as well as given the further control of the weighing unit with the restarting of the motor, which may affect the scale and/or at least lengthens the weighing process.

SUMMARY OF THE INVENTION

An object of the present invention is to provide a dynamic scale having only one weighing cell and having a takeoff device for flat goods transported on their sides, and a control method for such a dynamic scale, which do not exhibit the aforementioned disadvantages. The dynamic scale should be of simple and cost-effective design. The number of sensors and motors that allow a control of the dynamic scale should be minimized. Moreover, simple mounts for additional sensors at the input and output of the scale should be developed so as to enable at least one dimension measurement to be made.

To avoid a complicated control method of the dynamic scale, a high throughput of 90 lpm (letters per minute) should be achieved at a transport velocity of 530 mm/s, especially given standard letters, for example the US10 format and given the standard letter and compact letter of Deutsche Post AG in Germany. A simple and identical control method should be achieved for all letter formats, from the post card with a length of 140 mm to the B4 format with a length of 353 mm, and for different letter thicknesses.

The dynamic scale in accordance with the invention has an input-side first assembly for thickness measurement, a transport device having transport belts arranged on a weighing plate, photoelectric barriers as sensors; encoders; and a second assembly for determining the width of the good with a width sensor, an output side takeoff device having an ejection roller, and a control processor that is connected in terms of communication with the aforementioned assemblies for their control, with a first sensor at the input and a second sensor at the output of the weighing plate. The control processor is programmed (configured) to operate as follows.

The processor starts a length measurement and the driving of the transport belts of the transport device with a first transport velocity, the transport belts being arranged on the weighing plate.

The control processor starts and implements a dynamic weighing process as long as the second sensor detects the leading edge of the first flat good at the output of the weighing plate, and the thickness measurement is ended.

The control processor checks whether a valid weight measurement result is present in order to determine the weight of the first flat good, and causes first flat good to be transported with the first transport velocity in the transport direction to the output of the dynamic scale if a valid weight measurement result is present.

The control processor determines the weight of the first flat good if the weighing process has not ended, and causes the first flat good to be transported with a second transport velocity in the transport direction to the output of the dynamic scale, wherein the second transport velocity is lower than the first transport velocity.

The control processor makes a width measurement of the flat good based on inputs thereto.

The control processor initiates the end of the weight measurement during the dynamic weighing process if a third sensor at the input of a takeoff device of the dynamic scale detects the leading edge of the first flat good, and a check yields that no valid weight measurement result is present.

The control processor causes a next flat good to be supplied to the input of the dynamic scale if the check yields that a valid weight measurement result is present.

The control processor further controls the drive of the transport belts of the weighing unit with the first transport velocity, and activates a second motor with a third transport velocity in the transport direction, so the second motor drives an ejection roller that ejects the flat good in the takeoff device, wherein the third transport velocity is greater than the first transport velocity.

As long as no stop command has been given to the control processor, it repeats the above procedures.

The control processor of the dynamic scale is one of the multiple modules used for determining the length of a flat good. At the start of the length measurement, the start of a counting process and a counting of encoder pulses takes place during the driving of the transport belts after the first sensor detected the leading edge of the first flat good, NS wherein the control processor subsequently starts and implements a length measurement while the flat good is transported along a path segment of the transport path, until the first sensor detects the trailing edge of the first flat good at the input of a weighing plate, wherein the length measurement is ended.

The first sensor is a component of the overall arrangement for determining the length of a flat good, and is arranged within the dynamic scale. At least one additional component of the aforementioned overall arrangement, however, may be outside of the dynamic scale.

The sensors are designed as transmitted light barriers, but at least one additional sensor can be provided that is not designed as a transmitted light barrier.

A control method for the dynamic scale includes the steps controlled by the control processor:

a) a length measurement is started by the control processor, and after this the driving of the transport belts of the transport device that are arranged on the weighing plate is started with a first transport velocity, b) start a dynamic weighing process until the second photoelectric barrier detects the leading edge of the first flat good G1 at the output of a weighing plate, and end the thickness measurement, c) check whether a valid weight measurement result is present, d) determine the weight of the first flat good and the first flat good is transported with the first transport velocity in the transport direction to the output of the dynamic scale, if a valid weight measurement result is present, e) determine the weight of the first flat good if the weighing process has not ended, and the first flat good is transported with a second transport velocity in the transport direction to the output of the dynamic scale, wherein the second transport velocity is lower than the first transport velocity, f) implement a width measurement of the flat good, g) initiate the end of the weight measurement during the dynamic weighing process if the third photoelectric barrier at the input of a takeoff device of the dynamic scale detects the leading edge of the first flat good and the check yields that no valid weight measurement result is present, h) supply a next flat good to the input of the dynamic scale if the check yields that a valid weight measurement result is present, i) further control the drive of the transport belts of the weighing unit with the first transport velocity, and activate a second motor with a third transport velocity in the transport direction, wherein the motor drives an ejection roller that is arranged to eject the flat good in the takeoff device, wherein the third transport velocity is greater than the first transport velocity, and k) branch back and repeat the routine in the event that no stop command has been given to the control processor.

The weighing plate of the dynamic scale has a guide wall, and a transport device for a flat good lying on its side, and a supply deck, as well as the output-side takeoff device. The supply deck is subdivided into four subsections that adjoin one another in a row in the transport direction. A first subsection of the supply deck is situated in the input area of the dynamic scale. A weighing plate in a middle, second subsection of the supply deck is situated as a load on a single weighing cell. The weighing plate length in the second subsection of the supply deck is optimized for flat goods having a standard format, such that for this optimally small gaps are generated between the flat goods, and a maximum throughput of flat goods per minute is achieved. A cover for a width sensor follows in a middle, third subsection. The two middle subsections together enable a dynamic processing of longer flat goods, for example of long formats up to the B4 format, wherein the third subsection is designed so that a long flat good (which, for example, has the B4 format) does not contact the third subsection upon leaving the second subsection. An ejection roller and at least one contact pressure finger form a simple takeoff device that is arranged near the output of the dynamic scale. The takeoff device is arranged on a base plate of the chassis of the dynamic scale. The weighing plate of the dynamic scale has a trapezoidal footprint with two non-parallel lateral sides, wherein one of the non-parallel lateral sides abuts the guide wall of the weighing plate and forms a longitudinal edge. The larger of two parallel lateral sides of the trapezoidal footprint forms a transverse edge of the weighing plate and is arranged at the input side of the dynamic scale, in terms of the flow of goods. It is provided that a metal angle plate is installed at a flat base plate of the chassis, at a distance in the y-direction of a Cartesian coordinate system from the guide wall of the weighing plate, [such] that a maximum plate wall distance A exists between a location on the back wall of a lower housing shell of the dynamic scale and a plate wall of the metal angle plate that is angled upward. A virtual tangent in the y-direction rests at the most remote location of the rear housing wall of the dynamic scale. A vertex between the transverse edge at the input side in terms of a flow of goods and the longitudinal edge of the weighing plate is arranged at a maximum edge distance B from the virtual tangent. An alignment wall bounds, in the y-direction, a first subsection of the supply deck of the dynamic scale at the input side in terms of a flow of goods, and is at a distance C from the tangent at the input side in terms of a flow of goods. An additional alignment wall bounds a fourth subsection of the supply deck in the y-direction of the Cartesian coordinate system, at the input side in terms of a flow of goods, and is at a distance D from the tangent at the output side in terms of a flow of goods, wherein $A<B<C\leq D$.

The dynamic scale has three sensors that are electrically connected with the control processor of the dynamic scale in order to receive activation signals and to transfer sensor signals, and a motor in the takeoff device as well as a motor that is arranged in a frame below the weighing plate. The motors are electrically connected with the control processor of the dynamic scale in order to receive control signals of a control method of the dynamic scale. The supply deck has openings for the first and third sensors. A second sensor is at a first distance from the first sensor in the transport direction x, after the output-side transverse edge of the weighing plate, and the third sensor is immediately adjacent to the alignment wall at the output of the scale, at a second distance from the second sensor in the transport direction, wherein the first distance is greater than the second distance.

Components determine the three dimensions of the flat good are also arranged entirely or partially in the dynamic scale. Preferably, only one arrangement for determining one of the three dimensions of the flat good is partially arranged in the dynamic scale. The other arrangement for determining the remaining two dimensions of the flat good are arranged entirely in the dynamic scale. In the preferred exemplary embodiment, the first sensor is simultaneously a component of an arrangement for determining the length of a flat good to be weighed. Another component of that arrangement is an external sensor that is arranged in a station situated before the dynamic scale in the transport path, for example in an automatic supply station. The control processor of the dynamic scale is an additional component of the arrangement for determining the length of the flat good to be weighed. The arrangement for determining the length of the good and an arrangement for determining the width of the good are mounted on the floor base. The arrangement for determining the thickness of the flat good is arranged on a weighing plate. A mounting for the first sensor is installed immediately before the input of the weighing plate on the chassis of the dynamic scale. This the first sensor emits a signal when the leading edge of a flat good reaches the first sensor, and this signal forms a start signal for the operation of the dynamic scale.

A thickness sensor is installed immediately after the input-side transverse edge of the weighing plate, at the back side of the guide wall of the weighing plate. The second sensor of the dynamic scale is installed after the output-side transverse edge of the weighing plate at the chassis of the dynamic scale. This second sensor emits a signal when the leading edge of the flat good reaches the second sensor.

A width sensor is installed immediately after the output-side transverse edge of the weighing plate, in the transport direction, below a covering of the width sensor. The covering is installed at the weighing plate and loads the weighing cell. The covering has a window for the width sensor. An edge of the covering at the input side, in terms of the goods flow, is situated deeper than an edge of the covering at the output side, in terms of the goods flow. The mounting of the width sensor downstream of the weighing plate is attached to the chassis of the dynamic scale. The third sensor projects into the transport path downstream of the width sensor, in the transport direction, and immediately after the edge of the covering at the output side, in terms of the goods flow. The third sensor installed immediately before a shaft of an ejection roller of the takeoff device, at the chassis of the dynamic scale. The ejection roller of the takeoff device has a radius that is 4 to 6 times greater than the radius of the shaft on which the ejection roller is installed. The third sensor is arranged in an area situated closest to the weighing plate, next to the shaft, between the radius of the ejection roller and the radius of the shaft, preferably at the edge of the ejection roller.

DESCRIPTION OF THE PREFERRED EMBODIMENTS

Figure 1:
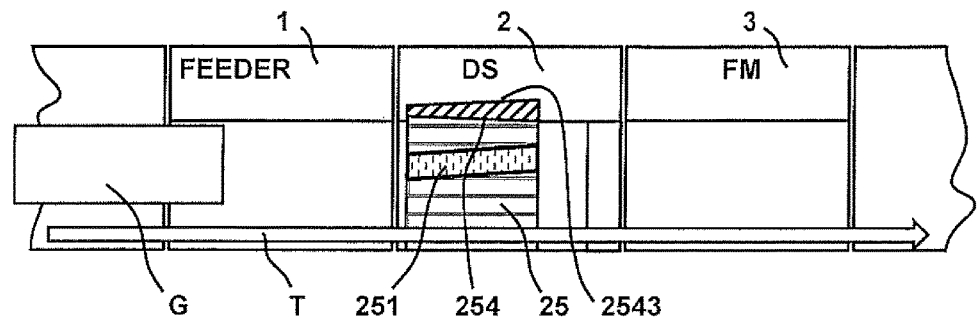
FIG. 1 is a plan view of a simplified, schematic arrangement of stations of a known goods processing system.

FIG. 1 shows a plan view of a simplified, schematic arrangement of stations of a known goods processing system, a flat good G is transported along a transport path T and traverses multiple stations of the goods processing system. Multiple flat goods that are transported in succession are also referred to as a goods flow. A first station 1 precedes—is upstream in terms of the goods flow of—a second station 2, the dynamic scale (DS). A weighing plate 25 of the dynamic scale has a trapezoidal footprint with two non-parallel lateral sides, wherein one of the non-parallel lateral sides and [sic] meets a guide wall 254 of the weighing plate and forms a longitudinal edge. The larger of two parallel lateral sides of the trapezoidal footprint forms a transverse edge that is at the input side of the dynamic scale, in terms of the flow of goods. A third station 3 is downstream in terms of the goods flow, thus after the dynamic scale (DS) in the transport path. For example, in a franking system, the first station 1 is an individualization station to automatically supply (FEEDER) individualized flat goods, and the third station 3 is a franking machine (FM). Stations 1 and 2 have a transport device with at least one transport belt 251 and a free-running wheel (not shown). The at least one transport belt 251 leads each flat good to a guide wall 254 at an acute angle. A collar (shaded) is bent upwardly from the upper edge of the guide wall 254 up to an outer edge. The outer edge 2543 of the weighing plate 25 is parallel to the longitudinal edge of the at least one transport belt 251.

The transport velocity is increased, or is at least equally high, from station-to-station in the transport direction x. Due to the free-running wheel, each station is able to draw a flat good G from the preceding station and to transport it further.

Figure 2:
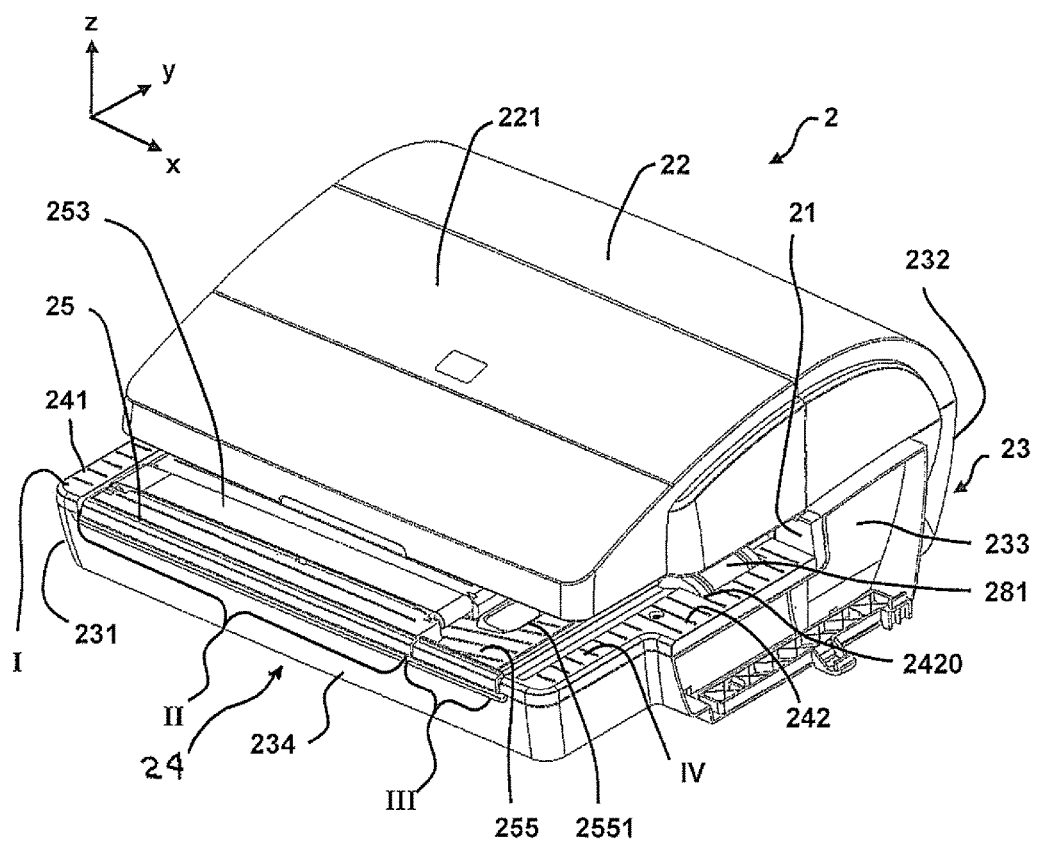
FIG. 2 is a perspective depiction of a dynamic scale in accordance with the invention for flat goods situated on their sides, from the upper right front.

FIG. 2 shows a perspective depiction of a dynamic scale 2 for flat goods situated on their side, from the upper right front. An upper housing shell 22 is equipped with a hinged, transparent hood 221 and is situated on a lower housing shell 23, which has two side walls 231, 233, a rear housing wall 232, and a forward wall 234. A supply deck 24 is installed on the lower housing shell 23 so as to proceed from an input side 241 thereof to an output side 242 thereof, in terms of the flow of goods. The supply deck 24 is bounded in the y-direction by an alignment wall 21, at the output side 242 in terms of the flow of goods.

Figure 3:
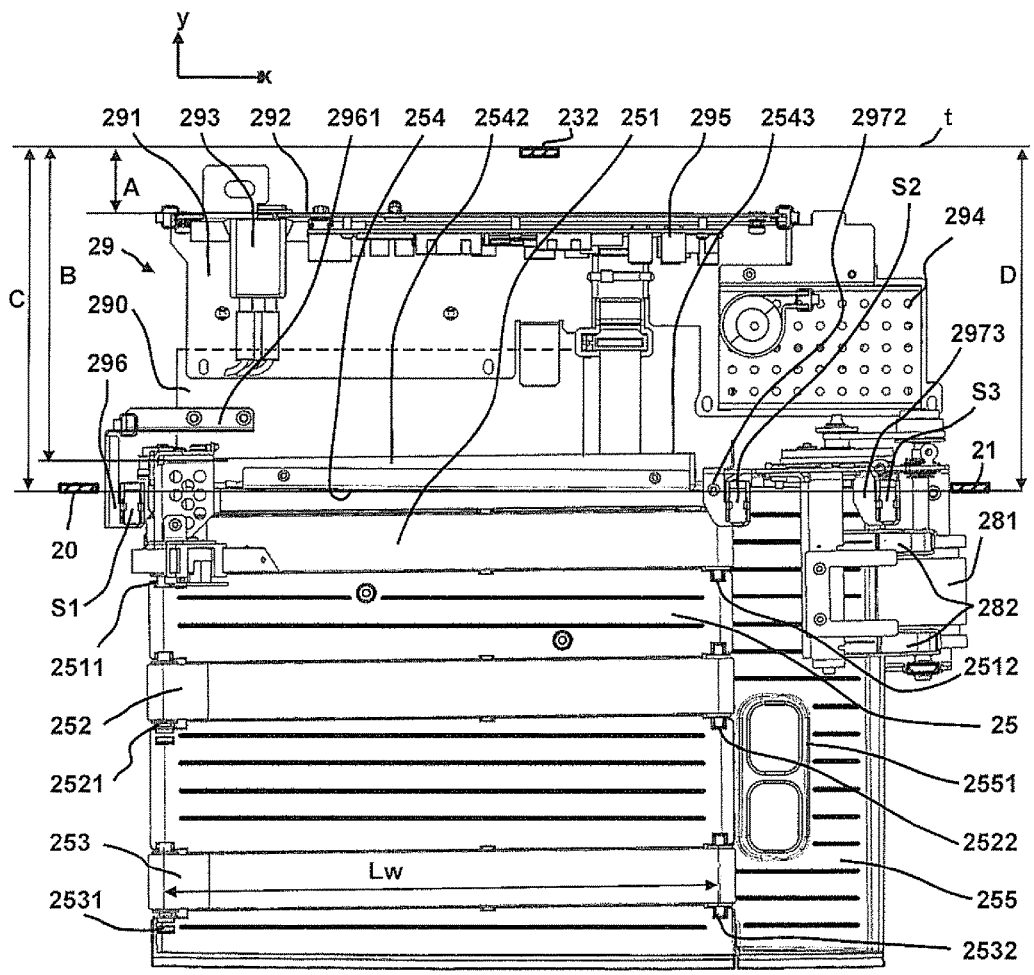
FIG. 3 is a plan view of a dynamic scale in accordance with the invention without housing.

The supply deck 24 is composed of a first subsection I at the input side, in terms of the flow of goods, and a fourth subsection IV at the output side. The first and fourth subsections are separated from one another by a second section II and third section III. The weighing plate 25 is arranged in the second section II. A covering 255 for a width sensor is installed at the weighing plate 25, in the third section III. Also in the third section III, at least one first window opening 2551 is provided in the covering 255 of the width sensor, this first window opening 2551 extending in the y-direction and beginning opposite a transport area of a third transport belt 253 that is arranged on the weighing plate 25 at the farthest distance from a guide wall 254 (FIG. 3) of the weighing plate 25. The subsection I at the input side 241 and the subsection IV at the output side 242 of the supply deck 24 are situated at approximately the same height above a base plate 290 (FIG. 3). An alignment wall 20 (not visible in FIG. 2) bounds the first subsection I of the supply deck 24 in the y-direction, and an alignment wall 21 bounds the fourth subsection IV of the supply deck 24 in the y-direction. The alignment wall 20 at the output side 242 is at a somewhat smaller distance from a tangent t (shown in FIG. 3) than the alignment wall 21 at the output side 241. The first subsection I at the input side 241, and the fourth subsection IV at the output side 242 of the aforementioned supply deck 24, as well as the covering 255 for the width sensor, also have additional window openings respectively for a number of sensors. These sensors, which are covered by an upper housing shell in the depiction according to FIG. 2, are explained below using FIG. 3.

FIG. 3 is a plan view of a dynamic scale without the housing. The upper housing shell is removed, and for the lower housing shell 23 (FIG. 2), only one location of the rear housing wall 232 and a part of the two alignment walls 20, 21 for flat goods are shown. The dynamic scale has a chassis 29 with a flat base plate 290 and a metal angle plate 291 installed thereon, and a sheet wall 292 is bent upwardly from the metal angle plate 291, thus in the z-direction. The rear wall 232 of the lower housing shell 23 of the dynamic scale is situated at a maximum sheet wall distance A=2 to 4 cm from the angled sheet wall 292 in the y-direction of a Cartesian coordinate system. A virtual tangent t is shown, which extends parallel to the transport direction x. The angled sheet wall 292 is next to the aforementioned location of the rear housing wall 232 of the lower shell, and lies parallel to the tangent t. A circuit board of a mainboard 295 is attached to a front side of the angled sheet wall 292 so as to be releasable. The circuit board carries a control processor that is fed from a mains adapter 294. A mains plug socket 293 for mains connection to the mains adapter 294 is externally accessible via an opening (not shown) in the rear housing wall 232. A retention plate 296 for a first sensor S1, which is curved in a u-shape, is installed on the base plate 290 at the input side of the dynamic scale, in terms of the flow of goods, and at the rear area of the scale between the metal angle plate 291 and the weighing plate 25. The guide wall 254 is limited in its height, thus in the z-direction. A collar is bent upwardly in the y-direction from an upper edge 2541 (FIG. 10) of the guide wall 254. The collar 2542 is expanded in the y-direction and ends in an outer straight edge 2543 of the weighing plate 25, wherein the edge 2543 does not extend parallel to the transport direction x. A corner at the input side, in terms of the flow of goods, at the outer edge 2543 of the collar of the weighing plate 25 near to the guide wall 254, is arranged at a maximum edge distance B from the virtual tangent t. The guide wall 254 serves to guide a longitudinal edge of a flat good to be weighed during its transport. The rear housing wall 232 is curved slightly outwardly, and the guide wall 254 of the weighing plate is formed in a straight line. If it is assumed that the virtual tangent t is at the location of the rear housing wall 232 that is furthest distant in the y-direction, so then the guide wall 254 of the weighing plate proceeds at an acute angle relative to the tangent t, at an angle of approximately 0.1° to 1.5°, from the left end (thus its end that is downstream in terms of the flow of goods) to the right, thus in the direction of the start of the dynamic scale that is upstream in terms of the flow of goods. The first subsection (I, FIG. 2) of the supply deck 24, at the input side in terms of the flow of goods, is bounded in the y-direction by the alignment wall 20 at the input side in terms of the flow of goods. The fourth subsection (IV, FIG. 2) of the supply deck 24, at the output side 241 is bounded in the y-direction by the alignment wall 21 at the output side 242. The alignment wall 20 is at a distance C, at the input side, from the virtual tangent t; and the alignment wall 21 is at a distance D, at the output side, from the virtual tangent t; wherein A<B<C≤D.

The underside (not shown) of the weighing plate 25 rests on a frame, and the frame is attached at a load introduction point (not shown) of a weighing cell. The weighing cell is installed on the flat base plate (FIG. 4). A flat good to be weighed is moved with a first transport velocity across the weighing plate 25 by at least one transport belt 251, 252, 253, at an acute angle relative to the transport direction x, as soon as a control procedure of the dynamic scale is started, and a first motor (not shown) is thereby activated. The drive shaft 2501 (FIG. 4) of the first deflection rollers 2511, 2521, 2531 and the undriven shaft 2502 (FIG. 4) of the second deflection rollers 2512, 2522, 2532 of the at least one transport belt 251, 252, 253 are at an acute angle of 0.1° to 1.5° relative to the y-direction. This means that the at least one transport belt 251, 252, 253 is arranged on the weighing plate 25 so that, at the input side, there is a first transport belt distance on the weighing plate 26 in the y-direction, from the guide wall 254. This first transport belt distance is greater than a second transport belt distance that is displaced therefrom parallel to the transport direction x. Three transport belts 251, 252, 253 are preferably arranged parallel to one another, but not parallel to the guide wall 254, on the weighing plate 25. The retention plate 296 that is curved in a u-shape is installed with an angle piece 2961 at the base plate 290, so that this angle piece projects beyond the flat base plate 290 in the z-direction, and in part counter to the transport direction x. The retention plate 296 that is curved in a u-shape has two bends in the direction opposite the y-direction, and respectively has on its two bends, a receiver part and a transmitter part of the first sensor S1, wherein the first sensor S1 is electrically connected with an electronic circuit of the mainboard. A first motor (FIG. 4) for driving the transport belt is started by a control processor of the mainboard as soon as said first sensor S1 detects the leading edge of a first letter that has been individualized from a stack by the individualization station 1, wherein the transport belts are arranged so as to be able to move across the weighing plate 25. The first sensor S1 may additionally be used for a length measurement of the flat good. The respective first deflection roller 2511, 2521, 2531 of each transport belt 251,

252, 253 is upstream in terms of goods flow at the weighing plate 25. A respective second deflection roller 2512, 2522, 2532 of each transport belt 251, 252, 253 is downstream in terms of goods flow at the weighing plate 25. A second and third sensor are installed in a mounting 297 at the output side of the weighing plate 25. For example, the sensors are designed as transmitted light barriers LS1, LS2, LS3. The second and third sensors S2, S3 are mounted on two retention plates, each curved in a u-shape, which are installed in a mounting 297 that is installed with a first bend (not shown) pointing in the y-direction on the flat base plate 290. The arrangement of the receiver and transmitter parts corresponds to that of the first sensor S1. Near the second deflection roller, the mounting has a retention plate 2972 curved in a u-shape for the second sensor S2, as well as, in the region of an ejection roller, a retention plate 2973 curved in a u-shape for the second sensor S3. Each of the two retention plates 2972, 2973 has two bends that extend in a direction counter to the y-direction, and a yoke that connects these two bends. The retention plates 2972, 2973 curved in a u-shape are thereby situated next to one another with a clearance in the transport direction x, each with its yoke are parallel to the sheet wall 292. The weighing plate 25 has an effective length Lw that is less than a first length L1 between the first and second sensors S1 and S2, and in the transport direction x the covering 255 has a length Lx that is greater than a second length L2 between the second and third sensors S2 and S3, wherein L2<L1 (FIG. 4). The effective length Lw of the weighing plate 25 in the transport direction x of the Cartesian coordinate system is determined by a standard, very commonly used longest good to be weighed, plus an additional measuring path that the good travels in its movement onto the weighing plate as long as the weighing result is yet to be determined. The covering 255 for the width sensor following the weighing plate 25 is situated deep below the lower bend of the retention plate 2972 of the second sensor, and rises at an angle to the input of the elevated subsection IV of the output side 242 of the supply deck 24. The covering 255 (FIG. 2) has a window opening 2551 between the two retention plates 2972, 2973. An ejection roller 281 and contact pressure mechanism 282 of a takeoff device 28 are at the output of the dynamic scale. The takeoff device 28 is installed on the base plate 290.

Figure 4A:
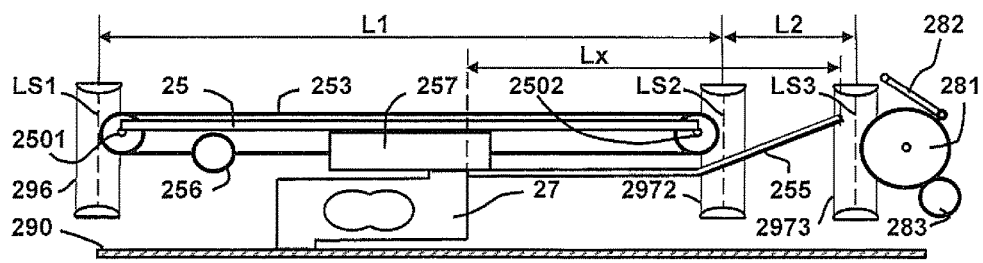
FIG. 4a is a simplified, schematic view of a transport device of the dynamic scale in accordance with the invention from the front, in a first operating phase before the start.

In FIG. 4a, a simplified schematic view of a transport device of the dynamic scale is depicted from the front, in a first operational phase before the start of the transport of flat goods by means of the transport belts of the dynamic scale. During operation, the light rays of the photoelectric barriers LS1, LS2, LS3 proceed between the receiver parts and transmitter part of each sensor S1, S2, S3. The first photoelectric barrier LS1 is situated at a first distance E>½(L1−Lw)+K before a drive shaft 2501 of the first deflection rollers, opposite to the transport direction x. The second photoelectric barrier LS2 is situated at a second distance F>½(L1−Lw)+K after a drive shaft 2502 of the second deflection rollers, in the transport direction x. The axes of the drive shafts 2501, 2502 are at an acute angle of 0.1° to 1.5° relative to the y-direction of the Cartesian coordinate system, such that the flat goods are transported closer to the guide wall of the weighing plate 25 by the transport belts during the operation of the dynamic scale (FIG. 3). The clearance of the drive shafts 2501 and 2502 of the weighing plate 25 yields the effective length Lw, and the summand K is an additional safety clearance. The first length L1 is between the photoelectric barriers LS1 and LS2, and the second length L2 is between the photoelectric barriers LS2 and LS3. The transmitter/receiver modules of the first photoelectric barrier LS1 are in a retention plate 296 before the weighing plate 25, and allow the control processor of the mainboard (FIG. 3) to an early detection of an interruption of the light beam by a leading edge of a flat good. Upon detecting the leading edge of the first flat good, the driving of the transport belts of the transport device that are arranged on the weighing plate is started by the control processor. Moreover, an electronic circuit is electrically connected with each photoelectric barrier, this electronic circuit being arranged on the mainboard 295, for example, in order to achieve an increased immunity to the influence of extraneous light on optical sensors. The second sensor 52 is also formed as a photoelectric barrier LS2 and serves to detect the leading edge of the letter at the output of the weighing plate. The transmitter/receiver components of the second photoelectric barrier LS2 are arranged in a retention plate 2972 at the transport path, immediately after the deflection rollers of the transport belts of the weighing plate 25.

The third sensor S3 is likewise formed as a photoelectric barrier LS3 and serves to detect the leading edge of the letter at the end of the weighing plate. The transmitter/receiver components of the third photoelectric barrier LS3 are arranged in a retention plate 2973 at the transport path, immediately before the ejection roller 281. The third sensor S3 is located near to a shaft of the ejection roller 281 that, together with the contact pressure mechanism 282 form at least one contact pressure finger, situated at the output of the dynamic scale.

The first motor 256 is arranged (the manner is not shown) in a bay of a frame 257 below the weighing plate 25, and acts via a belt power train (not shown) on a respective first deflection roller of each transport belt, this deflection roller being at the input side, in terms of the flow of goods, on the weighing plate 25. The first motor has a motor shaft that is positively connected with a driving toothed belt roller which drives an additional toothed pulley wheel via a toothed belt. These drive forms a common drive for a number of driven transport belts. The additional toothed pulley is formed together with a small toothed wheel as a first transmission stage, and is installed so as to be rotatable on an additional fixed axis. The frame 257 is installed on a weighing cell 27. The latter is arranged on the base plate 290 of the chassis. A second motor 283 is arranged on the takeoff device 28 and drives the shaft of the ejection roller 281 via toothed belts and a toothed pulley power train. The covering 255 for a width sensor is situated in a parallel plane below the frame 257 of the weighing plate 25 and gradually rises upwardly in the transport direction, relative to the flat base plate 290, toward the output-side edge of the weighing plate 25, preferably at an incline so that a transported, long flat good (for example, having the B4 format) does not contact the third subsection III of the supply deck upon leaving the second subsection II.

In the simplified view according to FIG. 4a, modules were omitted.

Figure 10:
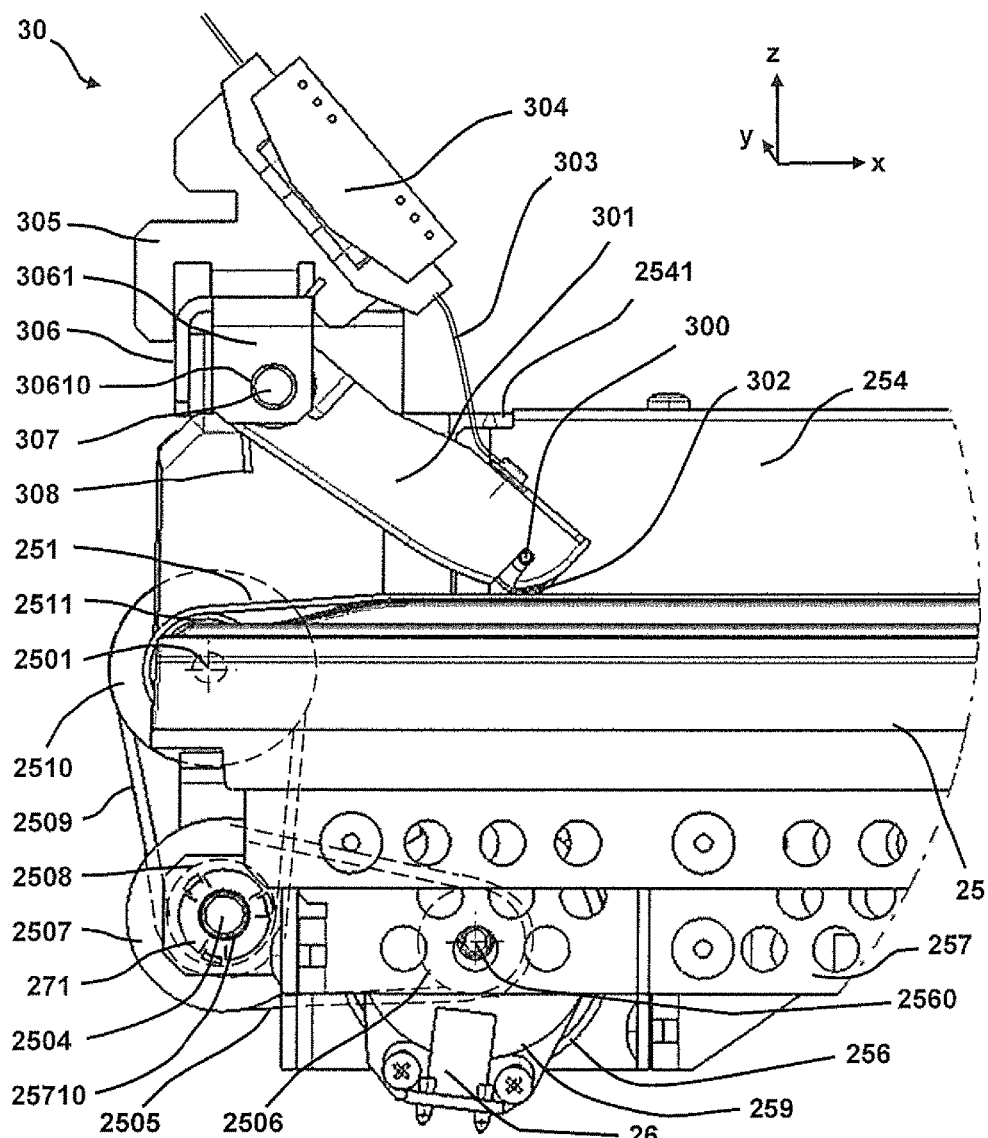
FIG. 10 is a perspective depiction of a first module for thickness measurement of a flat good to be weighed by the dynamic scale in accordance with the invention, from the front.
Figure 11:
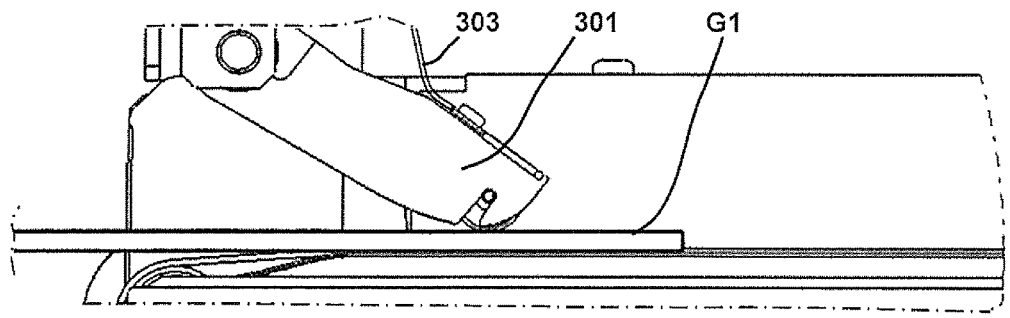
FIG. 11 is a perspective depiction of a detail of the first module, from the front, in a phase between phases 1 and 2, during a thickness measurement of a flat good to be weighed by means of the dynamic scale in accordance with the invention.

As shown in FIG. 4a, a first module for thickness measurement of a flat good to be weighed is arranged at the start of a transport path, on the weighing plate of the dynamic scale (see FIGS. 10 and 11). As a thickness sensor, it has a forked photoelectric barrier that is arranged in the transport path, following the first photoelectric barrier LS1 in the transport direction x.

A second module is provided for width measurement of the flat good and, for example, has a spindle for adjustment of the measurement position to the respective format boundary of interest. That is necessary since different formats also apply in different countries. It has a reflected light barrier, wherein a light-reflecting surface is installed on a housing part.

Figure 4B:
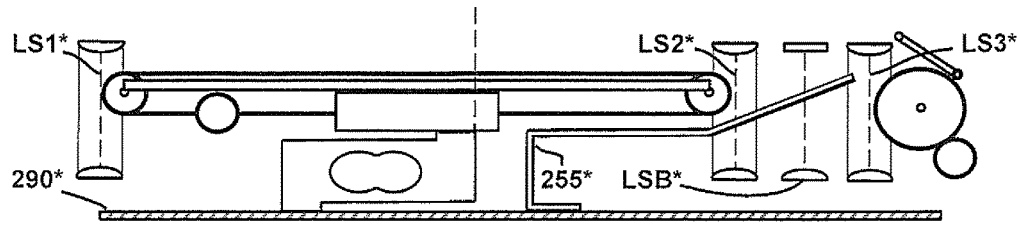
FIG. 4b is a simplified, schematic view of a transport device of the dynamic scale in accordance with the invention with an alternative covering for the width sensor.

FIG. 4b shows a simplified, schematic view of the transport device of the dynamic scale having an alternative covering 255\* for the width sensor, which has alternatively been installed on the base plate 290\*.

Figure 5:
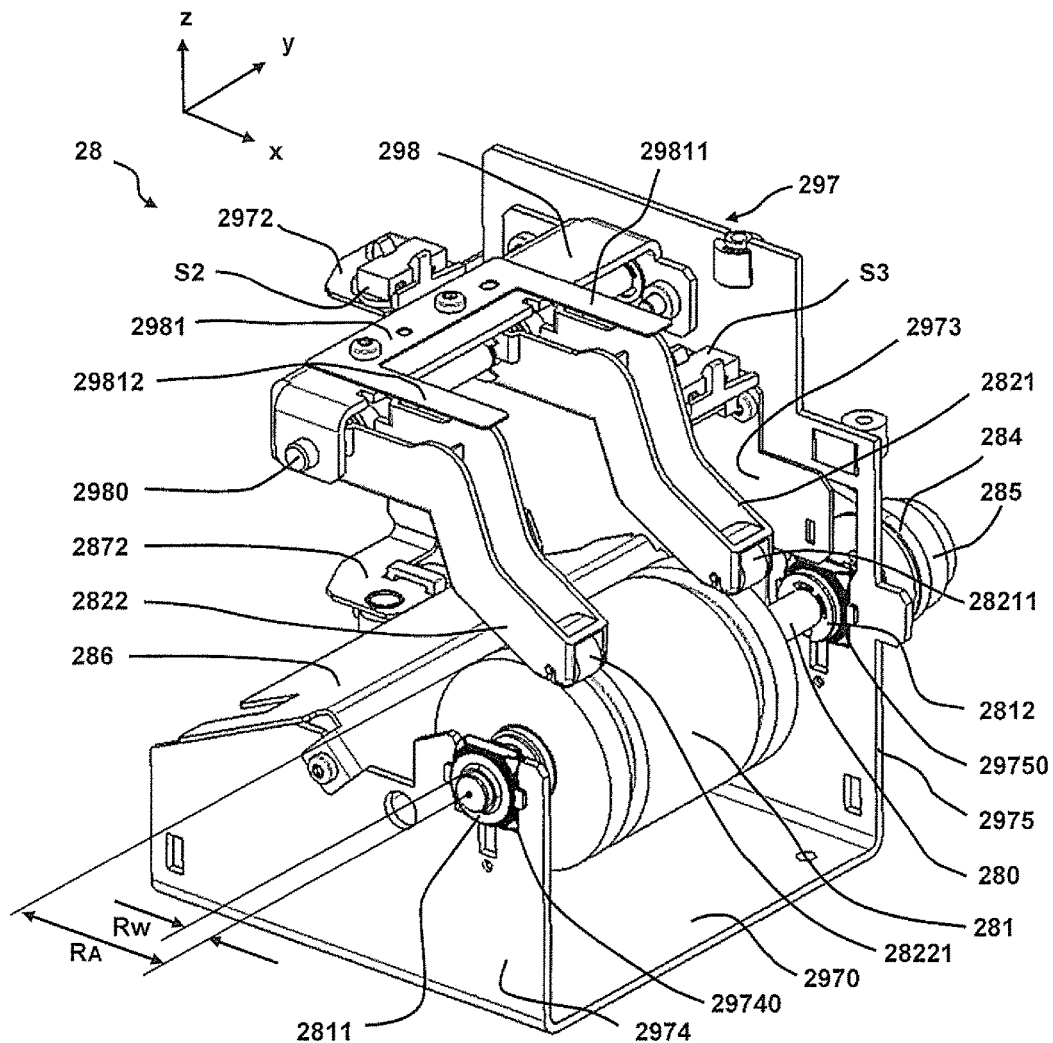
FIG. 5 is a perspective depiction of a takeoff device of the dynamic scale in accordance with the invention, from the upper right front.

FIG. 5 shows a perspective depiction of the takeoff device 28 of the dynamic scale, from the upper right front. The ejection roller 281 and the at least one contact pressure finger 282 are arranged in the mounting 297, at the output of the dynamic scale. The mounting 297 has a mounting base plate 2970 that is installed on the base plate 290. The base plate 2970 is installed directly on the base plate 290, the base plate 2970 extends in the y-direction. The mounting 297 also has two bends 2974, 2975 in the z-direction. The ejection roller 281 is installed positively on a drive shaft 280 supported in slide bearings 2811, 2812, and the drive shaft 280 is parallel to, or at an acute angle of 0.1° to 1.5° relative to, the y-direction. The ejection roller 281 has an outer radius RA>>RU>Rw, with RU=radius of the deflection rollers for the transport belts. The radius RA of the ejection roller 281, minus a radius Rw of the drive shaft of the ejection roller 281, defines the region situated upstream, in terms of the flow of goods, at a front side of the ejection roller that enables an arrangement of the u-shaped retention plate 2973 for the third sensor S3. The slide bearings 2811, 2812 are installed in openings 29740, 29750 of the u-shaped mounting 297, and the two bends 2974, 2975 that extend in the z-direction form lateral sides that are provided for slide bearing installation, such that the mounting for the installation of the ejection roller is open in the z-direction. The mounting 297 bears a takeoff device 28 for holding and ejection of a weighed, flat good from the dynamic scale. This takeoff device 28 is formed by the arrangement of the ejection roller and at least one contact pressure finger, or a number of contact pressure fingers that is/are spring loaded and rotatable around an axle. The contact pressure fingers automatically pinch the weighed, flat good so it is pressed against the ejection roller when it leaves the weighing plate 25. The installed drive shaft 280 projects in the y-direction from the opening 29750 of the bend 2975 of the u-shaped curved mounting 297, and carries a toothed pulley 283 for a toothed drive belt 284.

The bend 2975 thereby extends higher in the z-direction and is situated closer to the rear housing wall 232 than the bend 2974. A u-shaped curved retention plate 298 for a stationary rotation axle 2980 is arranged at a distance above the ejection roller, wherein the stationary rotation axle is parallel to, or at an acute angle of 0.1° to 1.5° relative to, the y-direction, and has two narrow contact pressure fingers 2821, 2822, or at least one contact pressure finger 282, having a greater width. The contact pressure fingers are biased with an elastic force by a leaf spring 2981.

The contact pressure fingers may be designed in active connection with the leaf spring 2981 to generate an additional contact pressure for thick flat goods. For example, the contact pressure fingers can each have two side walls spaced apart from one another, which have a curved Z-shape. Each installed contact pressure finger has, in the z-direction, at least one bulge at a first directional change of each Z-shaped curved contact pressure finger. The bulge is situated close to the rotation axis 2980 of the contact pressure finger, and exactly opposite the respective free spring end of the leaf spring 2981. The bulge may be realized identically or differently at one or both side walls of the contact pressure finger. The contact pressure force is directed toward the deflection of the free spring end of the installed leaf spring 2981, and is greatest at the maximum bulge.

At the free end of each rotatable, spring-loaded contact pressure finger, a non-driven roller 28211, 28221 is situated between the two side walls of the contact pressure finger. The flat good G is pinched between the rollers 28211, 28221 and the ejection roller 281 and is transported further.

As an alternative to the non-driven roller, an identically driven conveyor belt may be used, situated opposite the driven ejection roller 281.

Figure 6:
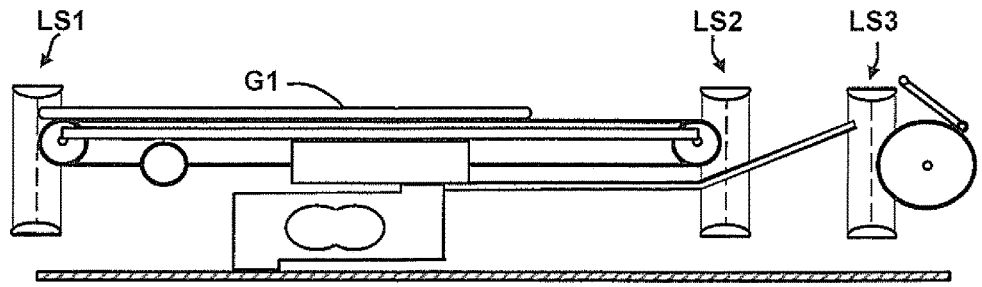
FIG. 6 is a simplified, schematic view of the transport device from the front, in a second operating phase at the start of the weighing of flat goods by the weighing cell of the dynamic scale in accordance with the invention.

FIG. 6 shows a simplified, schematic view of the transport device of the dynamic scale from the front, in a second phase at a start of the weighing of a first flat good G1 by means of the weighing cell of the dynamic scale, when the first photoelectric barrier LS1 detects the trailing edge of the first flat good G1.

Figure 7:
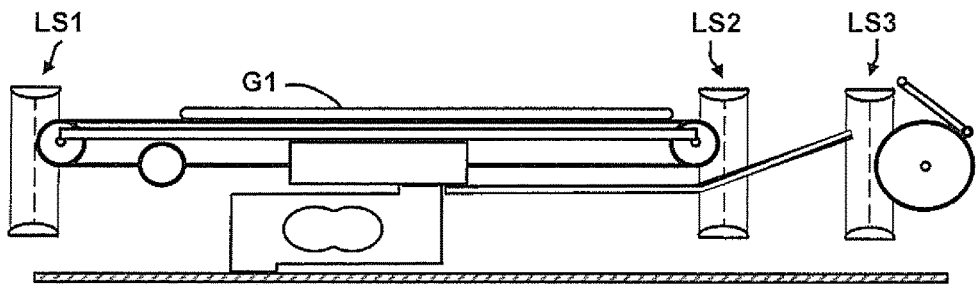
FIG. 7 is a simplified, schematic view of the transport device from the front, in a third phase at the end of the weighing of flat goods by the weighing cell of the dynamic scale in accordance with the invention.

FIG. 7 shows a simplified, schematic view of the transport device from the front, in a third phase at the end of the weighing of the first flat good G1 by means of the weighing cell of the dynamic scale, or while the flat good—for example a standard letter (US10 or DIN C6 length)—is transported on the weighing plate 25 to the output the elevated region of the dynamic scale. In the normal case, the weigh measurement is concluded before reaching the second photoelectric barrier LS2.

The control processor initiates a check as to whether a valid weight measurement result is present upon detecting the leading edge of the first flat good G1 (standard letter) by the second photoelectric barrier LS2. If no valid weight measurement result is present, the standard letter is transported farther with a lower velocity to the output of the dynamic scale. The third photoelectric barrier LS3 serves to establish whether the leading edge of the first flat good G1 (standard letter) has reached the third photoelectric barrier LS3. In this event, the termination of the weight measurement is initiated. Otherwise, if the check yields that a valid weight measurement result is present, the next flat good is supplied to the input of the dynamic scale (FIG. 8).

Figure 8:
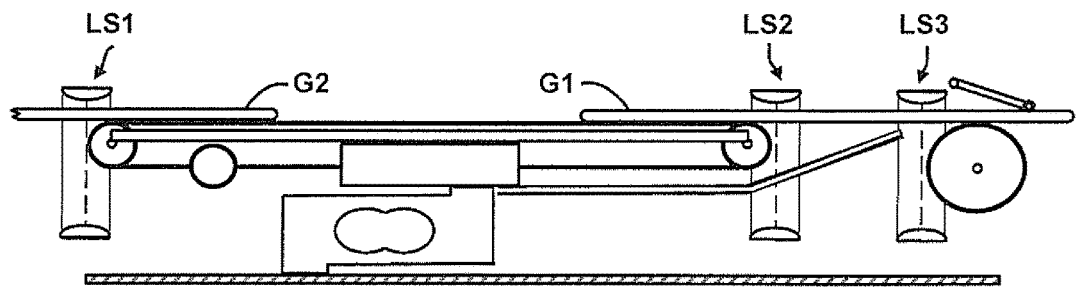
FIG. 8 is a simplified, schematic view of the transport device from the front, in a fourth phase before the ejection of a flat good after the end of the weighing by means of the weighing cell of the dynamic scale in accordance with the invention.

FIG. 8 shows a simplified, schematic view of the transport device from the front in a fourth phase before the ejection of the first flat good G1 after the end of the weighing by the weighing cell of the dynamic scale, while the next flat good G2 is supplied to the dynamic scale.

Figure 9:
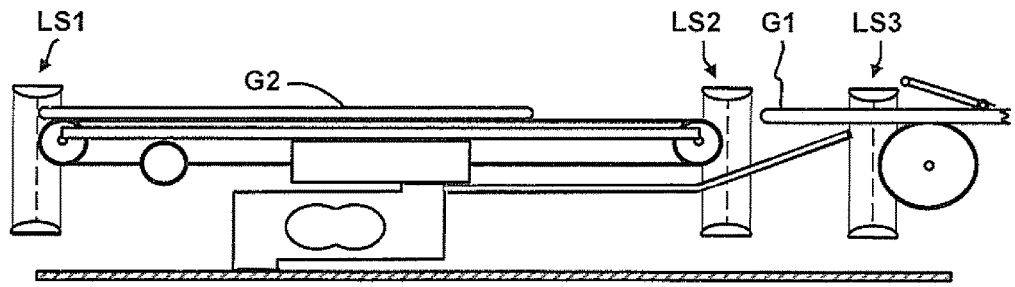
FIG. 9 is a simplified, schematic view of the transport device from the front, in a fifth phase during the ejection of a weighed flat good from the dynamic scale in accordance with the invention.

FIG. 9 shows a simplified, schematic view of the transport device from the front in a fifth phase during the ejection of the weighed first flat good G1 from the dynamic scale. It is shown in a state in which the weight measurement of a second flat good G2 may begin and the already weighed first flat good G1 is conveyed out of the scale via the ejection roller, without the weight measurement of the second flat good G2 thereby being affected by this.

In FIG. 10, a first module 30 for thickness measurement of a flat good to be weighed in the dynamic scale is shown from the front in a perspective depiction. The thickness measurement takes place using a braked lever 301 that is raised by the flat good by an amount corresponding to the thickness of the good, and thereby must overcome a mechanical resistance. Given decreasing goods thickness (letter thickness), the resistance is very small, and primarily gravity acts on the lever end at which a roller 302 is installed so as to be rotatable. Shortly before the placement of the roller 302 on the transport belt, the resistance is increased again in order to reduce the introduction of shocks, and thus possibly to attenuate shock pulses in the weight measurement signal. For example, for this purpose a thin exterior rubber layer may be installed on the roller 302. A transparent film 303 with non-transparent dashes is moved through an optical sensor 304 with the movement of the lever 301. The number of dashes is thereby counted, and the letter thickness is calculated with a known conversion factor. The lever is set so as to be "down" between two flat goods (letters), and this position shown in FIG. 10 is associated with a letter thickness of "0". The movement direction of the dashed film 303 may be detected by the control processor of the dynamic scale with the use aid of an optical sensor 304.

A first motor 256 is below the weighing plate 25 in a frame 257 and, via a two-stage power train is coupled in terms of its drive with the drive shaft 2501 of the first deflection rollers 2511, (2521, 2531) of the transport device (FIG. 3). The power train increases the motor torque, and the motor rotation speed is reduced. An encoder wheel 259 is installed on the motor shaft 2560 of the first motor 256. An encoder 26 is arranged at the encoder wheel and is electrically connected with a control processor of the dynamic scale. The first motor 256 is also electrically connected with the control processor of the dynamic scale, which allows the motor rotation speed to be regulated corresponding to a predetermined nominal value. The power train has two toothed pulleys, respectively having a large diameter and a small diameter. For example, at the crown gear edge the large external diameter is d1=2.5 cm and the small external diameter d2=1.8 cm. A toothed pulley 2506 having a smaller diameter has 25 teeth and is installed on the motor shaft 2560 of the first motor 256. A toothed pulley 2510 having a large diameter has 36 teeth. The toothed pulley 2510 and a number of first deflection rollers 2511 (2521, 2531) having a smaller diameter are installed positively and non-positively on the drive shaft 2501 (FIG. 3). Via a first toothed drive belt 2505, the toothed pulley 2506 drives a toothed pulley 2507 having a large diameter. A second toothed drive belt 2509 runs on the toothed pulley 2510 and is driven by a toothed pulley 2508 having a smaller diameter (indicated in a dashed line) that is covered by the toothed pulley 2507 (larger diameter) in FIG. 10. Both toothed pulleys 2507, 2508 are mechanically coupled via a rotation axle 2504 and are components of the power train. The rotation axle 2504 is supported on both sides in slide bearings 2581 (2582) that are installed at the input side, in terms of mail flow, in respective openings 25710 (25720).

The optical sensor 304 for the dashed film 303 is installed on a sensor retention plate 305 which is bolted onto an angle plate 306. The angle plate 306 is installed at the outer edge 2543 of the collar 2542 (FIG. 3) of the guide wall 254, near the corner of the weighing plate 25 that is at the input side, in terms of the flow of goods, which corner has the maximum edge distance B from the tangent t (FIG. 3). The mounting of the first module 30 thereby has the same angle as the edges of the transport belts of the transport device. The axle 300 of the roller 302 and a stationary axle 307 are therefore situated parallel to one another.

The angle plate 306 is bent in a u-shape in the direction of gravity (thus counter to the z-direction) and projects beyond the edge 2543 of the weighing plate to which it is attached. The bends 3061 (3062) of the angle plate 306 each have a circular opening 30610 (30620) for the stationary axle 307, which stationary axle 307 bears at the one end the lever 301 and a leg spring 308, which presses the roller 302 at the other lever end against the transport belt 251 as long as no flat good arrives between them.

Depicted in FIG. 11 is a perspective presentation of a detail of the first module, from the front, in a phase of the thickness measurement of a flat good to be weighed by means of the dynamic scale. A movement of the lever end of the lever 301 takes place corresponding to the thickness of the good G1, so the dashed film 303 is moved. This phase is between the first operating phase 1 (FIG. 4) and the second operating phase 2 (FIG. 6).

Figure 12:
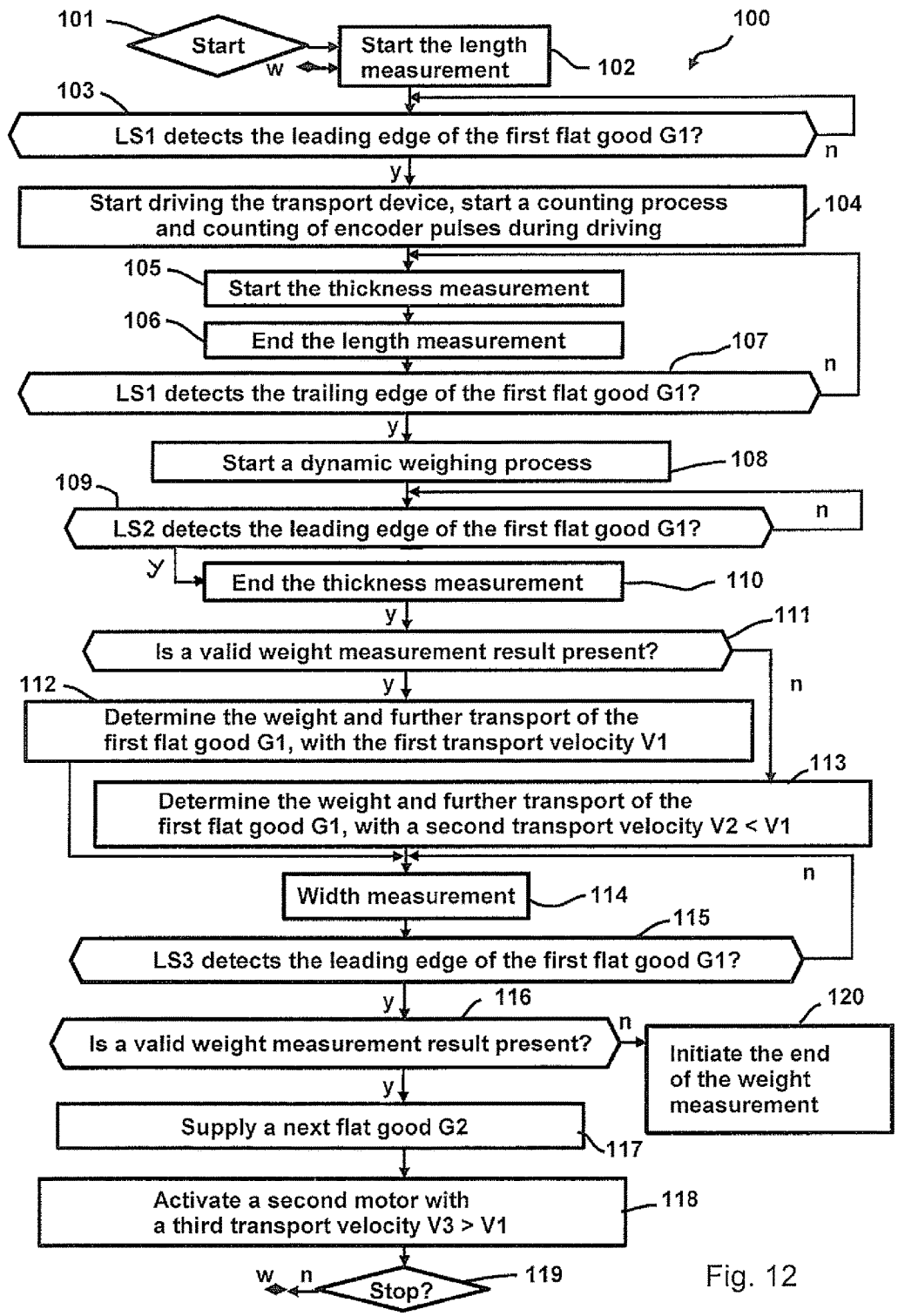
FIG. 12 is a simplified, schematic workflow plan of the method in accordance with the invention.

FIG. 12 shows a simplified, schematic workflow 100 for a control method of the dynamic scale, and includes the steps:

a) a length measurement is started by the control processor, and following this the drive of the transport belts of the transport device, said transport belts being arranged on the weighing plate, is started with a first transport velocity V1, wherein the start of a counting process and a counting of encoder pulses during driving takes place after the first photoelectric barrier LS1 detects the leading edge of the first flat good G1 (blocks 101 through 104); subsequently, a thickness measurement (block 105) is started and performed as long as the flat good is being transported along a path segment of the transport path (T), until the first photoelectric barrier LS1 at the input of a weighing plate detects the trailing edge of the first flat good G1 (block 107), wherein the length measurement is ended during the path segment (block 106), b) start a dynamic weighing process (block 108) until the second photoelectric barrier LS2 detects the leading edge of the first flat good G1 at the output of a weighing plate (block 109), and end the thickness measurement (block 110), c) check whether a valid weight measurement result is present (block 111), d) determine the weight of the first flat good G1, and further transport the first flat good G1 with the first transport velocity V1 in the transport direction x to the output of the dynamic scale (block 112) if a valid weight measurement result is present, e) determine the weight of the first flat good G1 if the weighing process has not ended, and further transport the first flat good G1 with a second transport velocity V2 in the transport direction x to the output of the dynamic scale, wherein the second transport velocity V2 is lower than the first transport velocity V1 (block 113), f) implement a width measurement of the flat good (block 114), g) begin the end of the weight measurement during the dynamic weighing process (block 120) if the third photoelectric barrier LS3 at the input of a takeoff device of the dynamic scale detects the leading edge of the first flat good G1 (block 115) and the check (block 116) yields that no valid weight measurement result is present, and h) supply a next flat good G2 to the input of the dynamic scale if the check yields that a valid weight measurement result is present (block 117), and i) further control the weighing unit and activate a second motor with a third transport velocity in the transport direction x, wherein the motor drives an ejection roller that is arranged to eject the flat good G1 in the takeoff device, wherein the third transport velocity V3 is greater than the first transport velocity V1 (block 118), and k) branch back (w) and repeat (block 119) the routine (100) in the event that no stop command has been given.

A technical method for determining the length of the flat good may precede the control method of the dynamic scale, and includes at least the method steps:

j) start a counting process of encoder pulses of a drive motor of a first station if the external photoelectric barrier ELS detects the trailing edge of the first flat good G1.

jj) end the process of counting encoder pulses if the internal first sensor of a second station reports the leading edge of the flat good to the microprocessor of the control processor of the second station.

jjj) determine the length of the flat good via the microprocessor of the control processor of the second station.

For example, an automatic individualization and supply station is intended as a first station, and the dynamic scale is intended as a second station. A computer program enables a corresponding data processing for the control processor of the dynamic scale. The sensor signals and encoder signals of the dynamic scale are queried by the control processor of the dynamic scale, which was presented in simplified form in the control method of the dynamic scale. Moreover, a computer-readable storage medium is provided in which program code is stored that, after it has been loaded into storage means of the control processor, enables the control processor to perform at least one method to control the dynamic scale in a predetermined chronological order.

A dimension measurement of all three dimensions (length, width and thickness) during the transport and a processing of the flat goods is also advantageously possible. The first sensor S1 is a component of an arrangement for determining the length of a flat good, wherein this component of the arrangement is within the dynamic scale (in station 2), and wherein at least one additional component of this arrangement is outside of the dynamic scale (in station 1).

The at least one additional component comprises a sensor that detects a change in light intensity from dark to light, from which a microprocessor of the control processor, for example, determines the trailing edge of the flat good if the microprocessor is signaled by the external sensor of this change in light intensity. If the external sensor thus informs the microprocessor of the trailing edge of the flat good, a counting process of encoder pulses begins which is ended if the internal first sensor informs the microprocessor of the control processor of the leading edge of the flat good. Given a known distance between the external sensor and the internal first sensor, the microprocessor of the control processor of the dynamic scale may determine the length of the flat good.

In an additional exemplary embodiment (not explained in detail), a station is arranged before the dynamic scale in the transport path. This station has a sensor that outputs a signal for length measurement if the leading edge and/or the trailing edge of a flat good reaches and leaves the length sensor. The control processor of the dynamic scale is electrically connected with the first sensor and a first encoder of the dynamic scale, via an interface with the length sensor of the preceding station, and with an encoder of the drive motor of a station preceding the dynamic scale, in order to evaluate the encoder signals and the signals for the external sensor length measurement, as well as those of the first sensor of the dynamic scale, in order to determine the length of the flat good supplied to the dynamic scale. The arrangement for determining the length of a flat good thus also here includes the first sensor of the dynamic scale and its control processor.

Alternatively, a microprocessor of a control processor of the first station 1 may also determine the length of the flat good if the result of the length determination is subsequently transmitted to the dynamic scale, wherein the first sensor of the dynamic scale is also involved in the determination of the length. Due to the first sensor, in this exemplary embodiment the determination of the length also takes place in part within the dynamic scale.

According to the preferred first embodiment variant, the dimension measurement of the width and thickness takes place with the one module (FIG. 10) and an additional module having a width sensor LSB* (FIG. 4B) and entirely within the dynamic scale, in contrast to the aforementioned arrangement for determining the length of a flat good, which is arranged only partially within the dynamic scale.

Alternatively, in another embodiment, a determination of all three dimensions of the flat good may be performed entirely within the dynamic scale, in that the first sensor detects the leading edge and the trailing edge of the flat good, and the encoder pulses that occur between the determining of the leading edge and the trailing edge of the flat good are counted.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A dynamic scale having an input side at which an individualized item to be weighed, among plurality of items to be weighed, enters said dynamic scale, and an output side at which each item exits said dynamic scale, said dynamic scale comprising:

a thickness measurement assembly at said input side of said dynamic scale;

a weighing plate with transport belts of a transport device that transport the item to be weighed across said weighing plate in a transport direction from an input side of said weighing plate to an output side of said weighing plate;

a width measurement assembly situated at said output side of said dynamic scale;

a takeoff device situated at said output side of said output side of said dynamic scale, comprising an ejection roller;

a first sensor situated at said input side of said weighing plate, a second sensor situated at an output side of said weighing plate, and a third sensor situated in said takeoff device;

a control processor in communication with said thickness measurement assembly, said transport device, said width measurement assembly, said takeoff device, and said first, second and third sensors;

said control processor being configured to start a length measurement of a first of the items to be weighed by operating said transport device to drive said transport belts with a first velocity, when said first sensor detects a leading edge of said first of said items;

said control processor being configured to start dynamic weighing of said first of said items using said weighing plate until said second sensor detects said leading edge of said first of said items;

said control processor being configured to check whether a valid weight measurement from said dynamic weighing was provided to the control processor by the weighing plate and, if so, to determine a weight of said first of said items from said valid weight measurement, and to operate said transport device to further transport said first of said items with said first transport velocity in said transport direction to said takeoff device;

said control processor being configured to determine the weight of the first of said items if said dynamic weighing has not ended and to operate said transport device to further transport said first item with a second transport velocity in said transport direction to said takeoff device, with said second transport velocity being lower than said first transport velocity;

said control processor being configured to operate said width measurement assembly to make a width measurement of said first item;

said control processor being configured to end said dynamic weighing when said third sensor detects the leading edge of said first of said items and said check determines that no valid weight measurement result for said first of said items is present;

said control processor being configured to supply a next of said items, among said plurality of items to be weighed, at said input side of said dynamic scale if said check determines that said valid weight measurement result for said first of said items is present;

said control processor being configured to operate said ejection roller with a third transport velocity in said transport direction in order to eject said first item from said takeoff device, said third transport velocity being greater than said first transport velocity; and said control processor being configured to repeat said length measurement, said dynamic weighing, said check, said width measurement, and the transport of each subsequent item in said plurality of items to be weighed as long as no stop command is provided to said control processor.

2. A dynamic scale as claimed in claim 1 wherein said weighing plate comprises a guide wall, with said items to be weighed being transported on their sides in said transport direction, said transport direction being a direction x of a Cartesian coordinate system, and said dynamic scale having a supply deck parallel to an x/y-plane.

3. A dynamic scale as claimed in claim 2 wherein said weighing plate has a trapezoidal shape with two parallel sides that are perpendicular to said transport direction, and to non-parallel lateral sides, one of said non-parallel lateral sides adjoining said guide wall of said weighing plate and forming a longitudinal edge therewith, and wherein said dynamic scale comprises a covering for said width measurement assembly following said weighing plate in said transport direction, and wherein said dynamic scale comprises a detector arrangement that detects three Cartesian dimensions of each of said items to be weighed.

4. A dynamic scale as claimed in claim 3 wherein a larger of said two parallel sides of said trapezoidal shape of said weighing plate forms a transverse edge of said weighing plate at said input side of said weighing plate, and wherein said supply deck comprises a first subsection at said input side of said dynamic scale and a fourth subsection at said output side of said dynamic scale, and second and third subsections between said first and fourth subsections, with said weighing plate being situated in said second subsection and said covering being situated in said third section, and wherein said fourth subsection has an opening therein through which said ejection roller of said takeoff device projects so as to contact said items to be weighed after said weighing plate, and wherein only one detector for only one dimension of said detector arrangement is situated within said dynamic scale.

5. A dynamic scale as claimed in claim 4 wherein said length measurement assembly and said thickness measurement assembly are situated at the input side of the dynamic scale, and wherein said dynamic scale comprises:

a metal angle plate at a distance in the y-direction from the guide wall of weighing plate, mounted on a flat base plate of a chassis, with a maximum sheet wall distance A between a location of a rear wall of a lower housing shell and a sheet wall of the metal angle plate, said sheet wall being bent upwardly;

a collar bent upwardly in the y-direction from the upper edge of the guide wall, said caller having an outer edge;

a virtual tangent line proceeding from a location of the rear housing wall that is farthest in said y-direction and that extends parallel to the transport direction, with a corner at the input side of said dynamic scale, at the outer edge of said collar, having a maximum edge distance B from said virtual tangent;

an alignment wall dividing said first subsection at said input side in the y-direction, at a distance C from said virtual tangent at the input side;

a further alignment wall that bounds the fourth subsection in the y-direction, at the input side of the dynamic scale, at a distance D from the virtual tangent at the output side of the scale, wherein $A<B<C\leq D$;

an opening for a first sensor in said first subsection of said supply deck, immediately adjacent the guide wall of the weighing plate;

an opening for a second sensor in said covering, and an opening for a third sensor in the fourth subsection of the supply deck, said second sensor being at a first distance from said first sensor in said transport direction, and said third sensor being immediately adjacent to said alignment wall of the fourth subsection, and at a second distance from said second sensor;

said takeoff device being situated on said base plate of said chassis, with the ejection roller of the takeoff device situated opposite at least one contact pressure finger of the contact pressure mechanism;

a first motor of the transport device being installed on a frame below said weighing plate and driving said transport belts on said weighing plate;

first deflection rollers and an undriven shaft of said deflection rollers of the transport belt being situated at an acute angle of 0.1° to 1.5° relative to the y-direction; and a drive shaft of the ejection roller being parallel to said y-direction or at an acute angle of 0.1° to 1.5° relative to said y-direction.

6. A dynamic scale as claimed in claim 5 wherein said first sensor is a component of said length measurement assembly.

7. A dynamic scale as claimed in claim 6 wherein said transport device comprises an encoder that emits encoder pulses corresponding to movement of said transport belts, and wherein said control processor is configured to count said encoder pulses during movement of said transport belts after said first sensor detects the leading edge of the first flat item and to subsequently start and implement said thickness measurement while said first of said items is transported along a path segment until said first sensor detects the trailing edge of the first of said items at the input side of said weighing plate, thereby ending said length measurement.

8. A dynamic scale as claimed in claim 1, comprising a first assembly for thickness measurement of a flat good, having a mounting installed at the outer edge of the collar, near to the corner of the weighing plate that is at the input side, in terms of the flow of goods, wherein the corner exhibits the maximum edge distance from the tangent.

9. A dynamic scale as claimed in claim 1 wherein each of said sensors is a light barrier.

10. A dynamic scale as claimed in claim 1 comprising:
transmitter/receiver modules of a first photoelectric barrier installed in a retention plate at the beginning of a transport path immediately before the deflection rollers of the transport belts of the weighing plate, and
transmitter/receiver components of a second photoelectric barrier installed in a retention plate at the transport path, immediately after the deflection rollers of the transport belts of the weighing plate, and
transmitter/receiver components of the third photoelectric barrier installed in a retention plate at the transport path, immediately before the ejection roller.

11. A dynamic scale as claimed in claim 1, wherein the ejection roller is installed positively on a drive shaft borne in slide bearings, the ejection roller having an external radius that is larger than a radius of the deflection rollers for the transport belts and is larger than a radius of the drive shaft of the ejection roller, wherein the radius of the ejection roller minus the radius of the drive shaft of the ejection roller defines a region downstream, in terms of the flow of goods, at a facing side of the ejection roller that enables an arrangement of a u-shaped curved retention plate for the third sensor.

12. A dynamic scale as claimed in claim 1, wherein the transport belts are arranged on the weighing plate, such that a first transport belt distance from the guide wall of the weighing plate results in the y-direction on the weighing plate, at the input side in terms of the flow of goods, which first transport belt distance is greater than a second transport belt distance that is measured as a distance from the guide wall, displaced in parallel to the transport direction x.

13. A dynamic scale as claimed in claim 1, wherein the longitudinal edges of the transport belts are arranged on the weighing plate, parallel to one another and parallel to the edge of the collar of the guide wall.

14. A dynamic scale as claimed in claim 1, wherein a covering for a width sensor is situated in a parallel plane below the frame of the weighing plate, and as of the output-side edge of the weighing plate rises upward gradually in the transport direction relative to the flat floor plate at such a slope that a transported long flat good does not contact the third subsection of the supply deck upon leaving the second subsection.

15. A dynamic scale as claimed in claim 1, wherein a covering for a width sensor is installed on the floor plate and is situated in a parallel plane below the weighing plate, and as of the output-side edge of the weighing plate rises upward gradually in the transport direction relative to the flat floor plate at such a slope that a transported long flat good does not contact the third subsection of the supply deck upon leaving the second subsection.

16. A dynamic scale as claimed in claim 1 wherein said transport device comprises said first motor and said thickness measurement assembly comprises a second motor.

17. A method for operating a dynamic scale having an input side at which an individualized item to be weighed, among plurality of items to be weighed, enters said dynamic scale, and an output side at which each item exits said dynamic scale, said dynamic scale comprising a thickness measurement assembly at said input side of said dynamic scale, a weighing plate with transport belts of a drive device that transport the item to be weighed across said weighing plate in a transport direction from an input side of said weighing plate to an output side of said weighing plate, a width measurement assembly situated at said output side of said dynamic scale, a takeoff device situated at said output side of said output side of said dynamic scale, comprising an ejection roller, a first sensor situated at said input side of said weighing plate, a second sensor situated at an output side of said weighing plate, and a third sensor situated in said takeoff device, and a control processor in communication with said thickness measurement assembly, said transport device, said width measurement assembly, said takeoff device, and said first, second and third sensors, said method comprising:

with said control processor, starting a length measurement of a first of the items to be weighed by operating said transport device to drive said transport belts with a first velocity, when said first sensor detects a leading edge of said first of said items;

with said control processor, starting dynamic weighing of said first of said items using said weighing plate until said second sensor detects said leading edge of said first of said items;

with said control processor, checking whether a valid weight measurement from said dynamic weighing was provided to the control processor by the weighing plate and, if so, determining a weight of said first of said items from said valid weight measurement, and operating said transport device to further transport said first of said items with said first transport velocity in said transport direction to said takeoff device;

with said control processor, determining the weight of the first of said items if said dynamic weighing has not ended and operating said transport device to further transport said first item with a second transport velocity in said transport direction to said takeoff device, with said second transport velocity being lower than said first transport velocity;

with said control processor, operating said width measurement assembly to make a width measurement of said first item;

with said control processor, ending said dynamic weighing when said third sensor detects the leading edge of said first of said items and said check determines that no valid weight measurement result for said first of said items is present;

with said control processor, supplying a next of said items, among said plurality of items to be weighed, at said input side of said dynamic scale if said check determines that said valid weight measurement result for said first of said items is present;

with said control processor, operating said ejection roller with a third transport velocity in said transport direction in order to eject said first item from said takeoff device, said third transport velocity being greater than said first transport velocity; and with said control processor, repeating said length measurement, said dynamic weighing, said check, said width measurement, and the transport of each subsequent item in said plurality of items to be weighed as long as no stop command is provided to said control processor.

18. A method according to claim 17, wherein the sensors are designed as photoelectric barriers, and starting a counting process and a counting of encoder pulses during the driving of the transport belts arranged on the weighing plate, after the first photoelectric barrier detects the leading edge of the first flat good, while the flat good is transported along a path segment of the transport path, until the first photoelectric barrier detects the trailing edge of the first flat good at the input of a weighing plate, and ending the length measurement during the path segment.

\* \* \* \* \*